United States Patent
Attig et al.

(10) Patent No.: US 8,311,057 B1
(45) Date of Patent: Nov. 13, 2012

(54) MANAGING FORMATTING OF PACKETS OF A COMMUNICATION PROTOCOL

(75) Inventors: Michael E. Attig, San Jose, CA (US); Gordon J. Brebner, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 749 days.

(21) Appl. No.: 12/186,428

(22) Filed: Aug. 5, 2008

(51) Int. Cl.
*H04J 3/22* (2006.01)

(52) U.S. Cl. .................... 370/466; 370/474; 370/476

(58) Field of Classification Search .................... 370/466
See application file for complete search history.

(56) References Cited

U.S. PATENT DOCUMENTS

| | | | |
|---|---|---|---|
| 2002/0181500 A1* | 12/2002 | Higuchi et al. | 370/466 |
| 2004/0022236 A1* | 2/2004 | Blanco et al. | 370/353 |
| 2004/0114589 A1* | 6/2004 | Alfieri et al. | 370/389 |
| 2005/0021871 A1 | 1/2005 | Georgiou et al. | |
| 2005/0068981 A1* | 3/2005 | Park et al. | 370/466 |
| 2005/0120105 A1 | 6/2005 | Popescu et al. | |
| 2006/0098689 A1* | 5/2006 | Stultz et al. | 370/477 |
| 2006/0114931 A1* | 6/2006 | Miyata | 370/466 |
| 2007/0055932 A1 | 3/2007 | Glein et al. | |
| 2007/0220232 A1 | 9/2007 | Rhoades et al. | |
| 2007/0237146 A1 | 10/2007 | Hadzic et al. | |
| 2008/0126523 A1 | 5/2008 | Tantrum et al. | |
| 2009/0037440 A1 | 2/2009 | Will et al. | |

OTHER PUBLICATIONS

U.S. Appl. No. 11/818,788, filed Jun. 14, 2007, Attig et al.
U.S. Appl. No. 11/818,811, filed Jun. 14, 2007, Attig et al.
U.S. Appl. No. 11/818,792, filed Jun. 14, 2007, Brebner.
U.S. Appl. No. 11/818,722, filed Jun. 14, 2007, Brebner et al.
Soviani, Cristian et al.; "Synthesis of High-Performance Packet Processing Pipelines"; Proceedings of 43$^{rd}$ ACM/IEEE Conference on Design Automation; DAC 2006; Jul. 24-28, 2006; Copyright 2006 ACM; pp. 679-682.
Lee, Edward Ashford et al.; "Static Scheduling of Synchronous Data Flow Programs for Digital Signal Processing"; IEEE Trans. on Computers; Jan. 1987; Copyright 1987 IEEE; pp. 24-35.
Xilinx, Inc.; U.S. Appl. No. 12/186,057, by Attig et al.; filed Aug. 8, 2008.
Xilinx, Inc.; U.S. Appl. No. 12/186,078, by Attig et al.; filed Aug. 8, 2008.
Xilinx, Inc.; U.S. Appl. No. 12/186,099, by Attig et al.; filed Aug. 8, 2008.
Paulin, P. G. et al.; *Force-Directed Scheduling in Automatic Data Path Synthesis*, Proc of the 24$^{th}$ ACM/IEEE Conference on Design Automation (DAC), Jun. 28, 1987, pp. 195-202, ACM, New York, New York, USA.

* cited by examiner

*Primary Examiner* — Andrew Chriss
(74) *Attorney, Agent, or Firm* — LeRoy D. Maunu (57) ABSTRACT

A circuit manages input and output formats of the packets of a communication protocol. The circuit includes representation blocks and distribution and gather blocks coupled to the representation blocks. Each representation block is associated with a respective descriptor of the input and output formats. Each representation block processes a value of the respective descriptor. One or more of the representation blocks is adapted to modify the value of the respective descriptor. For each packet input in the input format, the distribution block distributes the value of each descriptor for the packet to the representation block associated with the descriptor. For each packet output in the output format, the gather block gathers the value of each descriptor for the packet from the representation block associated with the descriptor. The input format is changed to the output format in response to representation blocks modifying the value of the respective descriptor.

18 Claims, 4 Drawing Sheets

MANAGING FORMATTING OF PACKETS OF A COMMUNICATION PROTOCOL

FIELD OF THE INVENTION

The present invention generally relates to communication protocols, and more particularly to packetized communication protocols.

BACKGROUND

Many communication protocols use packets to convey data and control information over a communication link or through a communication network. A packet includes fields for the data and control information. To simplify the implementation of communication protocols, many communication protocols use a fixed format for the fields. However, fixed formats limit the capabilities and performance of an implementation of a communication protocol. For example, infrequently needed fields must be included in all packets to make the format fixed.

A communication protocol can be implemented using a pipeline of stages, with the packets flowing through the pipeline. High performance operation is achievable by distributing the processing of the communication protocol across the stages. With a fixed format, the fields of the packets are readily identified. However, pipelines are difficult and time consuming to implement when the format is not fixed, because the position of the fields is variable.

A communication protocol can be implemented using a processor. With a fixed format, simple data structures can describe the packet formation. More complex data structures can describe a format that is not fixed; however, it is difficult and time consuming to create these complex data structures. In addition, the processor frequently becomes a bottleneck preventing high performance operation.

The present invention may address one or more of the above issues.

SUMMARY

Various embodiments of the invention provide circuits for managing input and output formats of the packets of a communication protocol. A circuit includes representation blocks and distribution and gather blocks coupled to the representation blocks. Each representation block is associated with a respective descriptor of the input and output formats of the packets of the communication protocol. Each representation block processes a value of the respective descriptor. One or more of the representation blocks is adapted to modify the value of the respective descriptor. For each packet input in the input format, the distribution block distributes the value of each descriptor for the packet to the representation block associated with the descriptor. For each packet output in the output format, the gather block gathers the value of each descriptor for the packet from the representation block associated with the descriptor. The input format is changed to the output format in response to representation blocks modifying the value of the respective descriptor.

Various other embodiments of the invention provide systems and program storage media for producing a circuit for managing input and output formats of the packets of a communication protocol. A distribution block, multiple representation blocks, and a gather block are generated with the distribution and gather blocks coupled to the representation blocks. Each representation block is associated with a respective descriptor of the input and output formats of the packets of the communication protocol. Each representation block processes a value of the respective descriptor for each of the packets. One or more of the representation blocks is adapted to modify the value of the respective descriptor. For each of the packets input in the input format, the distribution block distributes the value of each descriptor for the packet to the representation block associated with the descriptor. For each of the packets output in the output format, the gather block gathers the value of each descriptor for the packet from the representation block associated with the descriptor. The input format is changed to the output format in response to representation blocks modifying the value of the respective descriptor.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings' in which.

DETAILED DESCRIPTION OF THE DRAWINGS

Figure 1:
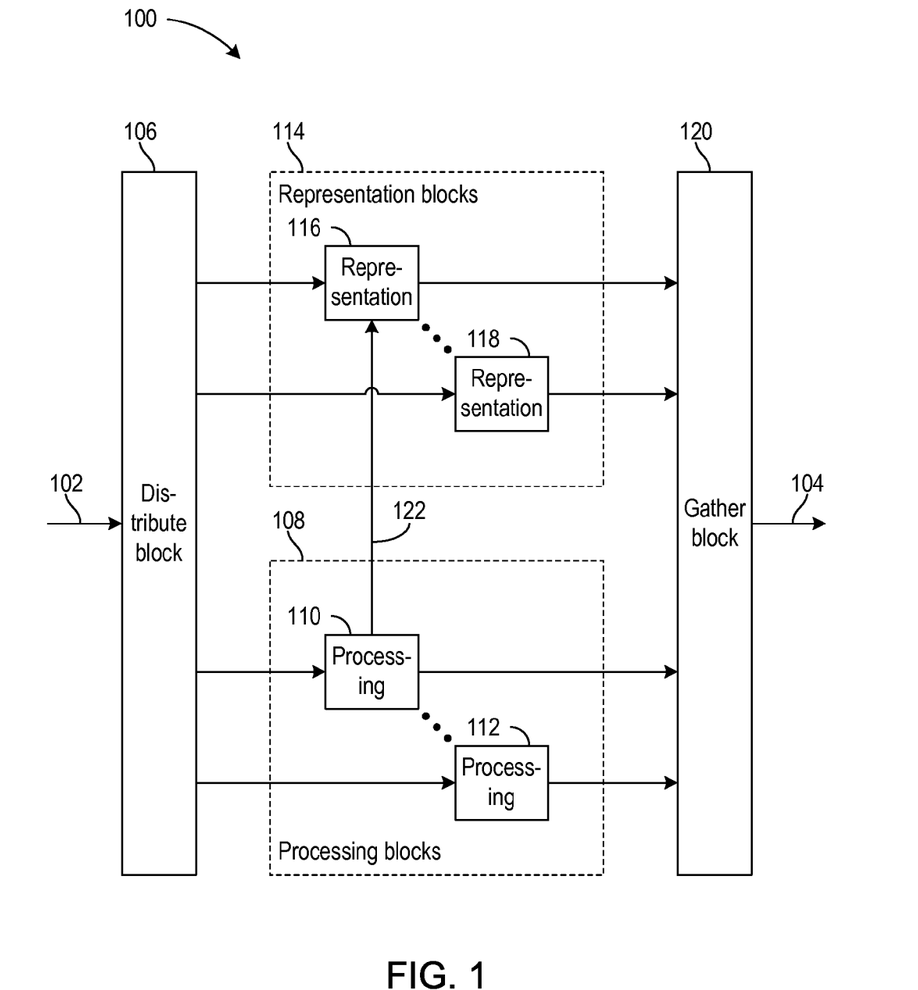
FIG. 1 is a block diagram of a packet processor in accordance with various embodiments of the invention.

FIG. 1 is a block diagram of a packet processor 100 in accordance with various embodiments of the invention. The packet processor 100 is a circuit that processes packets input on line 102 and output on line 104. The packets on lines 102 and 104 have a dynamic format. In one embodiment, the processor 100 produces the output packets on line 104 by inserting and/or removing certain fields of the input packets on line 102. In another embodiment, the length of a field of an input and/or output packet is variable. In yet another embodiment, the input and/or output packets on lines 102 and 104 have conditional fields that are included in some packets, but are not included in other packets. It will be appreciated that the packets may have various combinations of inserted, removed, variable length and/or conditional fields. Various embodiments of the invention manage these dynamic packet formats. In one embodiment, the input and output formats and the packet processing are declared in a specification of the packet processor.

Distribution block 106 distributes the fields of the input packets on line 102 to the processing blocks 108 according to the specification of the packet processor. In one embodiment, there is a corresponding processing block 110 through 112 for each field of an output packet on line 104, and the corresponding processing block calculates the value of the output field from internal state and specific fields of an input packet on line 102. Distribution block 106 provides these specific input fields to appropriate processing blocks 110 through 112.

Distribution block 106 also distributes descriptors to the representation blocks 114. In one embodiment, the distribution block 106 receives the descriptors along with the input packets on line 102 at an input port of the packet processor 100. In another embodiment, distribution block 106 creates a descriptor of each field during receipt of each packet on line 102. Distribution block 106 creates the descriptors of the fields in the incoming order of the fields within the input packet on line 102. The descriptor generally includes an identifier of the field and the length of the field. The distribution block 106 determines the length of any variable length fields, and distribution block 106 determines whether any conditional fields are present in each packet input on line 102.

In one embodiment, the representation blocks 114 include a representation block 116 through 118 for each field that could exist in the input and output packets on lines 102 and 104. Each representation block 116 through 118 stores the identifier of the field and the length of the field. In another embodiment, certain of the representation blocks 114 store a descriptor that includes the identifiers and lengths of multiple adjacent fields of the packets input and output on lines 102 and 104. In this embodiment, the number of connections is reduced between the distribution block 106 and the representation blocks 114, and the number of connections is reduced between the representation blocks 114 and the gather block 120.

In one embodiment, processing block 110 controls representation block 116 via line 122. For example, processing block 110 determines conditions for inserting a field of the descriptor of representation block 116, and when the field should be inserted, processing block 110 notifies representation block 116 to update the descriptor for the inserted field. The processing block 110 provides the condition on line 122 for inserting the field, and if the inserted field is a variable length field, processing block 110 also provides the length on line 122 of the inserted field.

It will be appreciated that some or all of the representation blocks 114 may not be controlled by the processing blocks 108. In addition, there is not necessarily a one-to-one correspondence between the processing blocks 108 and the representation blocks 114.

Gather block 120 gathers descriptors from the representation blocks 114 during the transmission of each packet output on line 104. Gather block 120 gathers the descriptors of the fields within the output packet on line 104 according to the specification of the packet processor. Gather block 120 obtains the value of each field for each descriptor from the appropriate processing block 110 through 112. Gather block 120 assembles the field values in an outgoing order to produce the output packet on line 104. In one embodiment, the gather block 120 outputs the packets along with the descriptors on line 104 at an output port of the packet processor 100.

Figure 2:
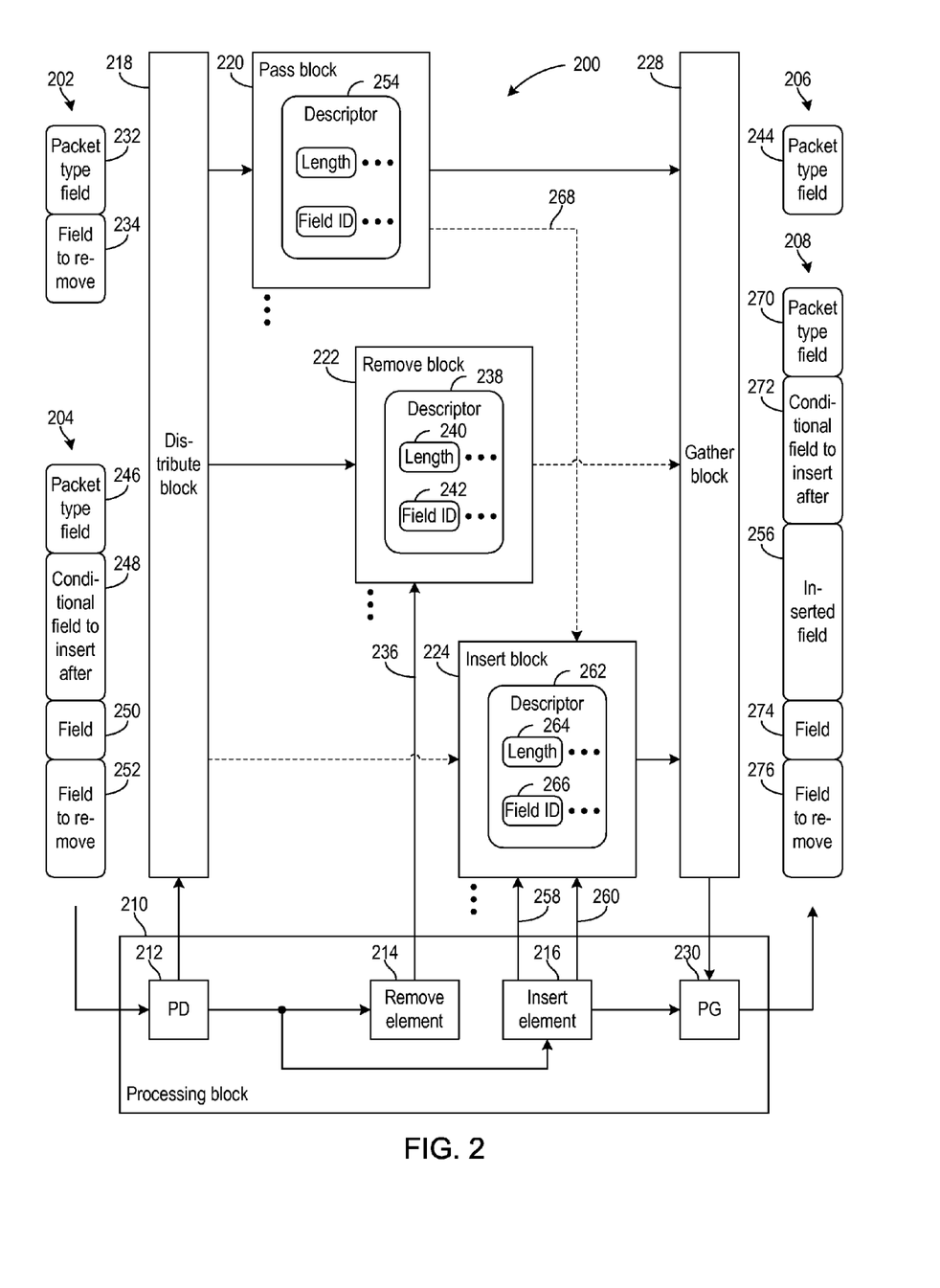
FIG. 2 is a dataflow diagram illustrating management of input and output formats of packets in accordance with various embodiments of the invention.

FIG. 2 is a dataflow diagram illustrating the management of input and output formats of packets in accordance with various embodiments of the invention. Packet processor 200 is a circuit that processes input packets 202 and 204 and respectively generates output packets 206 and 208 from these input packets.

Processing block 210 includes a packet distributor 212 that distributes the fields of the input packets 202 and 204 to the appropriate processing elements 214 and 216. Packet distributor 212 also transmits descriptors of the fields to descriptor distribution block 218. In another embodiment, descriptor distribution block 218 distributes the value of the descriptors received in the incoming order from a description input port of the processor 200 and the gather block 228 gathers the value of the descriptors transmitted in an outgoing order to a description output port of the processor 200.

Distribution block 218 distributes the descriptors to representation blocks 220, 222, and 224 in the incoming order of receiving the corresponding fields from input packets 202 and 204.

Gather block 228 gathers the descriptors of the fields from representation blocks 220, 222, and 224 in the outgoing order of transmitting the corresponding fields in output packets 206 and 208. Gather block 228 provides the descriptors to the packet gatherer 230, which assembles the fields of the descriptors in the output packets 206 and 208.

The example input packet 202 has in input format including a type field 232 and a field 234 in the incoming order of first receiving type field 232 and thereafter receiving field 234. In this example, packet distributor 212 of processing block 210 distributes the type field 232 to both the remove element 214 and the insert element 216, and distributes field 234 to the remove element 214. The packet distributor 212 distributes each field of the input packets 202 and 204 to the appropriate elements, such as elements 214 and 216, of processing block 210. Many of the elements use the fields received from the packet distributor 212 to generate a corresponding field of the output packets 206 and 208 in accordance with a specification of the packet processor. Distribution block 218 distributes a descriptor 254 of type field 232 to a pass block 220 and distributes a descriptor 238 of field 234 to remove block 222. The descriptor 238 of field 234 includes a length 240 and a field identifier 242. Similarly, the descriptor 254 includes a length and field identifier for the type field 232. In one embodiment, the field identifier 242 is a sequence number in an ordering of the fields of the input and output packets.

In this example, remove element 214 determines whether or not to remove field 234 from input packet 202 based on the type field 232 of input packet 202. For example, the field 234 should be removed for one type of packet and the field 234 should be retained for another type of packet. Remove element 214 indicates on line 236 whether remove block 222 should remove field 234 from input packet 202. In response to an assertion of the condition input port on line 236, remove block 222 modifies descriptor 238 to have a nullified length 240 of zero in one embodiment. In this example, insert element 216 determines that no field should be inserted into input packet 202. Thus, descriptor 262 retains an initial length of zero (264) in one embodiment.

Gather block 228 gathers the modified descriptors 254, 238, and 262, and provides the modified descriptors to packet gatherer 230. In one embodiment, gather block 228 skips over descriptor 238 from remove block 222 because the length 240 is zero, and gather block 228 provides only descriptor 254 of field 232 to packet gatherer 230. Packet gatherer 230 outputs packet 206 in the output format including type field 244 corresponding to type field 232 of input packet 202.

Example input packet 204 has in input format of fields 246, 248, 250, and 252 in that order. Field 246 is a type field, fields 248 and 250 are fields conditionally included in certain input packets, and field 252 is a field to remove conditionally. In this example, packet distributor distributes the type field 246 to processing elements 214 and 216, and the conditionally removed field 252 to the remove element 214. Distribution block 218 distributes descriptor 254 of adjacent fields 246 and 248 to pass block 220, a descriptor of field 250 to another pass block (not shown) and descriptor 238 of field 252 to remove block 222. In another embodiment of the invention, fields 246, 248, and 250 have respective descriptors in separate pass blocks. Embodiments with multiple fields per descriptor and with a single field per descriptor are discussed below in connection with FIG. 3.

In this example, remove element 214 determines that field 252 should not be removed from packet 204, because packet 204 has a type field 246 indicating that field 252 should not be removed from packet 204. Consequently, remove block 222 does not modify descriptor 238.

In addition, insert element 216 determines that a new field 256 should be inserted into packet 204. Insert element 216 provides the insertion condition on line 258 to insert block 224. For inserting a field with a variable length, insert element 216 also provides a length on line 260 for the inserted field. In one embodiment, insert block 224 has a descriptor 262 including a length 264 and an identifier 266 of the inserted field 256, and the length 264 is initially set to zero for each input packet 202 or 204. In this example, the inserted field follows the conditional field 248 of the input packet 204, such that the insertion is also conditional on the presence of field 248 in input packet 204. Pass block 220 provides an indicator on line 268 indicating that packet 204 includes conditional field 248. In response to the input port of the insertion condition on line 258 and the indicator on line 268, insert block 224 modifies descriptor 262 by updating the length 264 to the length on line 260 or a fixed length of the inserted field 256, as appropriate.

In an alternative example, distribution block 218 distributes a descriptor 262 of the field 248 marking the insertion point to insert block 224 instead of pass block 220, and descriptor 262 is modified to add the length and identifier of the inserted field 256 to the descriptor 262.

Gather block 228 gathers the descriptors 254, 238, and 262 from the representation blocks 220, 222, and 224 in the outgoing order. Packet gatherer 230 gathers the field values described by the descriptors 254, 238, and 262 and generates the output packet 208 having the output format including fields 270, 272, 256, 274 and 276. Field 270 corresponds to field 246 of input packet 204, field 272 corresponds to field 248, field 256 is an inserted field not found in input packet 204, field 274 corresponds to field 250, and field 276 corresponds to the field 252 that was not removed from input packet 204.

The packet gatherer 230 obtains the values of fields 270, 272, 256, 274 and 276 from the processing elements of processing block 210. For example, packet gatherer 230 obtains the value of the inserted field 256 from insert element 216 and the value of the conditionally removed field 252 from remove element 214. It will be appreciated that processing block 210 can also modify the values of fields 246, 248, 250, and 252 to generate the corresponding fields 270, 272, 274 and 276 of packet 208.

An overall order combines the incoming and outgoing order of the fields. For example, the input packet 204 has an incoming field order including fields 246, 248, 250, and 252 in that order, and the output packet 208 has an outgoing field order including fields 270, 272, 256, 274, and 276 in that order. Fields 246 and 270 are corresponding fields, fields 248 and 272 are corresponding fields, fields 250 and 274 are corresponding fields, and fields 252 and 276 are corresponding fields; however, inserted field 256 of output packet 208 has no corresponding field in input packet 204. The combined overall order is fields 246 (or corresponding field 270), 248 (or corresponding field 272), 256, 250 (or corresponding field 274), and 252 (or corresponding field 276) in that order. In this example, the overall order corresponds with the outgoing order of output packet 208. However, the overall order combining the incoming and outgoing orders of the fields does not correspond to the incoming and outgoing orders of any packet in another example, such as an example where field 252 is unconditionally removed. In this case, field 252 or 276 does not appear in the output packets and field 256 does not appear in the input packets.

In certain embodiments of the invention, the descriptors 254, 238, and 262 describe multiple adjacent fields in the overall order. Thus, descriptor 254 specifies both field 246 and field 248 of packet 204 as discussed above. While field 250 also appears to be adjacent to fields 246 and 248 in packet 204, field 250 is not adjacent to fields 246 and 248 in the overall order because inserted field 256 comes between fields 248 and 250 in the overall order. Thus, field 250 has a different descriptor than fields 246 and 248 in this embodiment.

Figure 3:
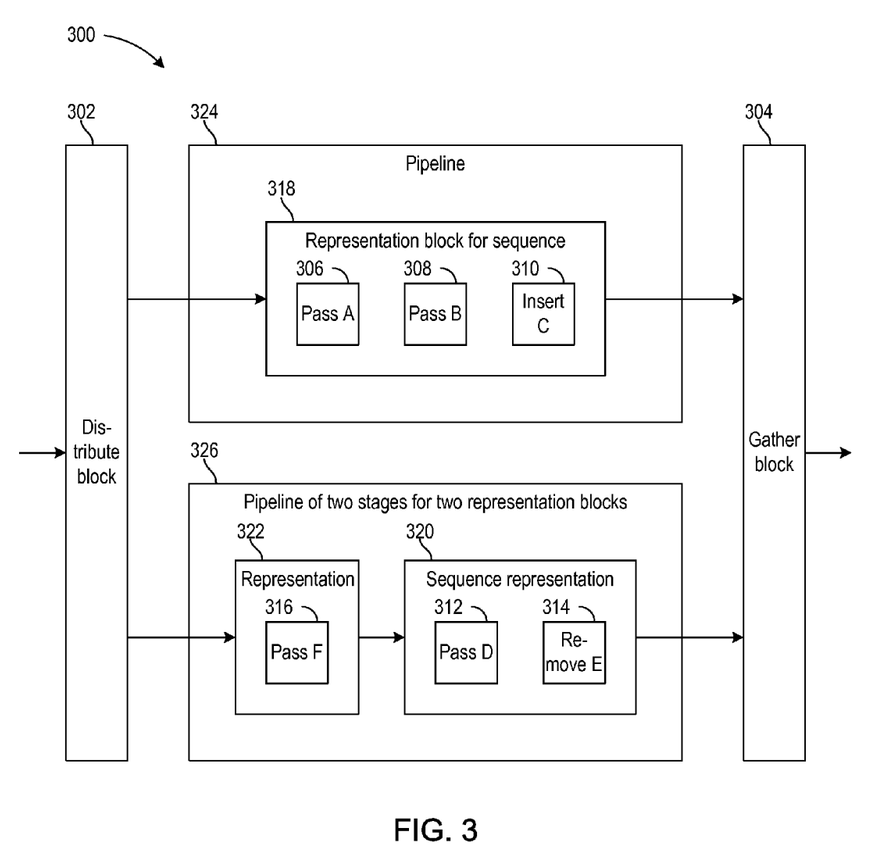
FIG. 3 is a block diagram of an example of a simplified manager of input and output formats in accordance with various embodiments of the invention.

FIG. 3 is a block diagram of an example of a simplified manager 300 of input and output formats in accordance with various embodiments of the invention. Before simplification, the manager includes a distribution block with a fanout to each of the elemental representation blocks 306, 308, 310, 312, 314, and 316, and a gatherer block with a fanin from each of the elemental representation blocks 306, 308, 310, 312, 314, and 316. To reduce the fanout of the distribution block 302 and to reduce the fanin of the gather block 304, the elemental representation blocks 306, 308, 310, 312, 314, and 316 are combined together. These reductions in fanout and fanin reduce the size of the implementation of the simplified manager 300.

In one embodiment, various possible combinations of the elemental representation blocks 306 through 316 are evaluated against performance metrics, such as latency in processing the packets and the fanout and fanin of the distribution and gather blocks. One of the possible combinations is selected to achieve the required latency while reducing the fanout and fanin.

Example 1 below illustrates the dynamic format and processing of packets by a packet processor that includes the simplified manager 300.

EXAMPLE 1 format example={
  A,
  [condition 1] B,
  [condition 2] D,
  E,
  [condition 3] F
};
  insert C after B;
  [condition 4] remove E;

The format declared in Example 1 includes fields A, B, D, E, and F. Fields B, D, and F are conditional fields that are conditionally included in a packet based on, for example, a value of field A. The input format is explicitly declared in Example 1, and the output format is implicitly declared to be the input format with field C inserted after field B when field B exists and with field E becoming a conditional field because field E is conditionally removed. The input format specifies the incoming order of the fields of the input packets and the output format specifies the outgoing order of the fields of the output packets.

The elemental representation blocks include pass blocks 306, 308, 312, and 316 for the conditional and fixed format fields, an insert block 310 for the field C inserted into each packet that includes conditional field B, and a remove block 314 for conditionally removed field E. For each packet, the elemental representations blocks 306, 308, 310, 312, 314, and 316 manage a descriptor of a corresponding field of the packet.

The pass blocks 306, 308, 312, and 316 forward a descriptor from the distribution block 302 to the gather block 304 without modification. Because the pass blocks 306, 308, 312, and 316 do not modify their descriptors, storage registers temporarily store the descriptors of pass blocks 306, 308, 312, and 316 in one embodiment. In addition, the storage registers of pass blocks 306, 308, 312, and 316 are readily combined to form storage queues. Such storage queues reduce the fanout of the distribution block 302 to one fanout per storage queue, and similarly reduce the fanin of gather block 304.

A storage queue for pass descriptors does not affect the order of distribution of the descriptors from the distribution block 302 and the order of gathering of descriptors by the gather block 304 when the descriptors are written to the storage queue in the incoming order and the descriptors are read from the storage queue in the outgoing order.

In one embodiment, an overall order of the fields encompasses both the incoming order and the outgoing order of the fields. Because field C is inserted after conditional field B, the overall order of the dynamic format is field A, field B, field C, field D, field E, and finally field F. The fields A, B, C, D, E, and F have corresponding sequence numbers in the overall order. The overall order is also an ordering of the elemental blocks 306, 308, 310, 312, 314, and 316 and their descriptors because of the correspondence between the fields and the elemental blocks 306, 308, 310, 312, 314, and 316. The overall order of the elemental representation blocks is pass block 306, pass block 308, insert block 310, pass block 312, remove block 314, and finally pass block 316. The pass descriptors flow through the storage queue in accordance with the overall order. Thus, the overall order encompasses the input and output orders because the incoming order is the overall order after removing the fields appearing in the output format but not appearing in the input format, and because the outgoing order is the overall order after removing the fields appearing in the input format but not appearing in the output format.

In one embodiment, a storage queue for pass descriptors is extended to also include the descriptor of an immediately following insert block 310 or remove block 314 in the overall order. Such an extended storage queue does not affect the distribution of the descriptors from the distribution block 302 and the gathering of descriptors by the gather block 304.

The insert block 310 and the remove block 314 separate the pass blocks 306, 308, 312, and 316 into three contiguous sequences respectively ending at the insert block 310, the remove block 314, and the last block 316 of the overall order. Representation block 318 manages the descriptors for the first contiguous sequence of pass block 306, pass block 308, and insert block 310. Representation block 320 manages the descriptors for the second contiguous sequence of pass block 312 and remove block 314. Representation block 322 manages the descriptor for the third contiguous sequence of pass block 316 that is the last block within the overall order. Thus, the elemental representation blocks 306, 308, 310, 312, 314, and 316 are combined into the representation blocks 318, 320, and 322.

Representation block 320 manages the descriptors for field D and field E. As shown above in Example 1, field E is conditionally removed. In one embodiment, representation block 320 eliminates the descriptor for field E when the condition is resolved to remove field E. Thus, representation block 320 provides the descriptor of field D to the gather block 304 after the descriptor of field E is nullified without first passing a zero-length descriptor of field E.

In one embodiment, the representation blocks 318, 320, and 322 are further combined into a pipeline arrangement, such as pipelines 324 and 326. There are many feasible arrangements of the representation blocks 318, 320, and 322. Certain of the arrangements, such as a random sampling of the feasible arrangements, are evaluated with one or more performance metrics. One of the evaluated arrangements is selected based on the performance metrics.

The feasible pipeline arrangements of the representation blocks 318, 320, and 322 should not affect the order of the distribution block 302 distributing the descriptors to the representation blocks 318, 320, and 322 and the order of the gather block 304 gathering the descriptors from the representation blocks 318, 320, and 322. In one embodiment, the overall order implies a reverse order including the representation blocks 322, 320, and 318, in that order; and descriptor distributing and gathering is feasible when each pipeline is a contiguous sequence of representation blocks within this reverse order.

For the representation blocks 318, 320, and 322 there are four feasible pipeline arrangements. The initial arrangement has the representation blocks 318, 320, and 322 arranged in three parallel pipelines of a single stage. The second arrangement is the illustrated arrangement of the pipeline 324 of one stage that is representation block 318, and the pipeline 326 with two stages that serialize the representation blocks 322 and 320 in that order. The third arrangement includes a two-stage pipeline of representation blocks 320 and 318 serialized in that order and a single-stage pipeline of representation block 322. The fourth arrangement is a three-stage pipeline serializing the representation blocks 322, 320, and 318, in that order. In one embodiment, the four feasible pipeline arrangements are evaluated with performance metrics, such as the latency and logic complexity of the resulting packet processor, and one of the arrangements is selected for implementing the manager 300 of the dynamic format.

An important example performance metric for the logic complexity is the number of pipelines 324 and 326 in the manager 300 of the dynamic format. The number of pipelines 324 and 326 determines the amount of fanout from the distribution block 302 and the amount of fanin to the gather block 304. This fanout and fanin determines the complexity of the demultiplexing and multiplexing functions of the distribution block 302 and the gather block 304. Reducing the fanout and fanin reduces this complexity. Thus, arrangements with fewer pipelines frequently have reduced logic complexity.

The latency of the packet processor is often determined by the processing blocks of the packet processor instead of the manager 300 of the dynamic format. In one embodiment, this latency is determined by partially or fully implementing the packet processor for certain feasible pipeline arrangements of the representation blocks 318, 320, and 322. Such implementing of the packet processor also establishes the logic complexity of the packet processor for each pipeline arrangement. In another embodiment, the latency and/or the logic complexity is estimated.

Based on the latency and the logic complexity of various feasible arrangements of the representation blocks 318, 320, and 322, one of the feasible arrangements is selected. In one example, the packet processor has a target latency and the selected arrangement is the packet processor having a minimum complexity among the arrangements having a latency less than or equal to the target latency. For the packet manager 300, the feasible arrangement of a single pipeline might have too much latency, such that the illustrated arrangement of pipelines 324 and 326 is selected for implementing the packet manager 300.

Figure 4:
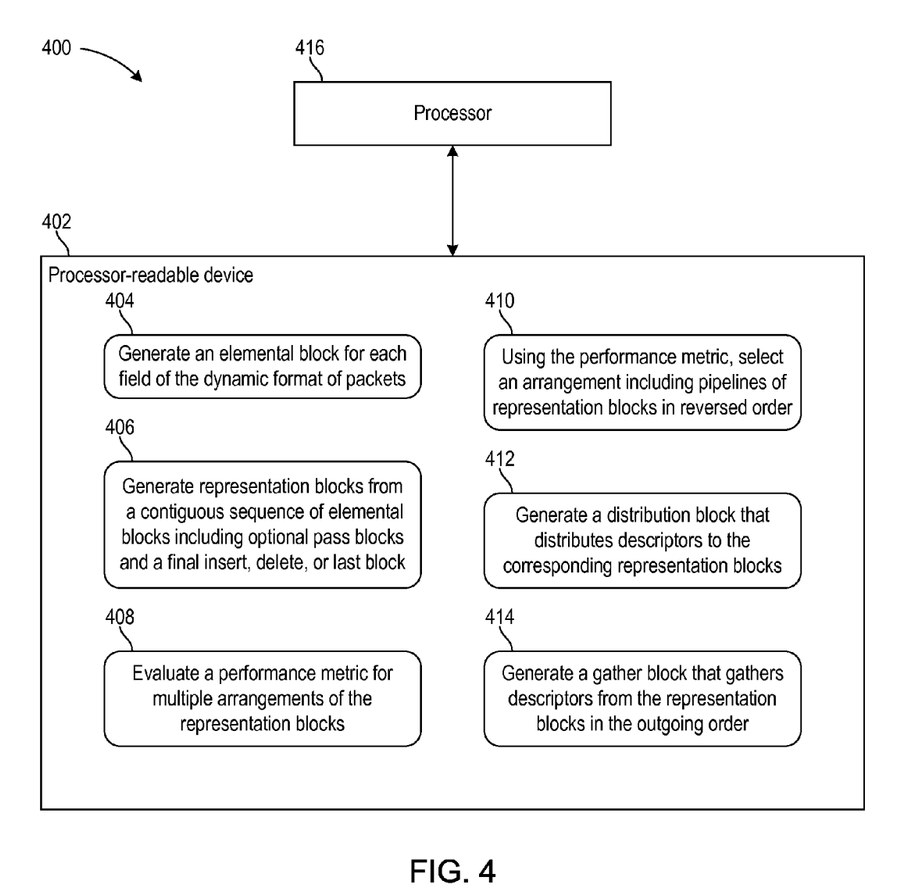
FIG. 4 is a block diagram of system for producing a circuit for managing input and output formats in accordance with various embodiments of the invention.

FIG. 4 is a block diagram of system 400 for producing a circuit for managing input and output formats in accordance with various embodiments of the invention. Processor-readable storage device 402 is configured with software modules 404, 406, 408, 410, 412, and 414 for producing a circuit for managing input and output formats of packets of a communication protocol.

Execution of the instructions of software module 404 by processor 416 causes processor 416 to generate an elemental representation block for each field of the dynamic format of the packets.

In one embodiment, the elemental block for each field is a pass block for passing the field, an insert block for inserting the field, or a remove block for removing the field. The elemental blocks are ordered in an overall order that corresponds to both the outgoing order of outputting the fields of the dynamic format of the packets and the incoming order of inputting the fields of the dynamic format of the packets.

Execution of the instructions of software module 406 by processor 416 causes processor 416 to generate representation blocks. Each representation block is associated with a respective descriptor of the dynamic format of the packets of the communication protocol. Each representation block processes a value of the respective descriptor for each packet, and one or more of the representation blocks modify the value of the respective descriptor.

In one embodiment, the representation blocks are generated from the elemental representation blocks. Each representation block is a combination of one or more elemental blocks within a contiguous subsequence of the overall ordering. Each contiguous subsequence includes and ends with an insert or remove block, or with the last elemental block in the overall order.

Execution of the instructions of software module 408 causes processor 416 to evaluate a performance metric for arrangements of the representation blocks. Each arrangement is a pipeline including one or more of the representation blocks in an order reversed relative to an order within the overall order of the contiguous subsequences for the representation blocks.

Execution of the instructions of software module 410 causes processor 416 to select one of the arrangements of the representation blocks in response to the performance metric.

Execution of the instructions of software module 412 causes processor 416 to generate a distribution block coupled to the representation blocks. For each input packet, the distribution block distributes the value of each of the descriptors for the packet to the representation block associated with the descriptor. The distribution block distributes the value of each of the descriptors in an incoming order of inputting the packet.

Execution of the instructions of software module 414 causes processor 416 to generate a gather block coupled to the representation blocks. For each output packet, the gather block gathers the value of each of the descriptors for the packet from the representation block associated with the descriptor. The gather block gathers the value of each of the descriptors in an outgoing order of outputting the packet.

In one embodiment, system 400 executing software modules 404 and 406 provides means for generating representation blocks, system 400 executing software module 412 provides means for generating a distribution block, and system 400 executing software module 414 provides means for generating a gather block.

Those skilled in the art will appreciate that various alternative computing arrangements, including one or more processors and a memory arrangement configured with program code, would be suitable for hosting the processes and data structures of the different embodiments of the present invention. In addition, the processes may be provided via a variety of computer-readable storage media or delivery channels such as magnetic or optical disks or tapes, electronic storage devices, or as application services over a network.

The present invention is thought to be applicable to a variety of systems for managing input and output formats of packets of a communication protocol. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A circuit for managing formatting of a plurality of packets of a communication protocol, comprising:
    a plurality of representation blocks, each associated with a respective one of a plurality of descriptors of input and output formats of the packets of the communication protocol, each representation block configured to process a value of the respective descriptor, and at least one of the representation blocks adapted to modify the value of the respective descriptor;
    wherein the plurality of representation blocks includes a representation block for each field of the packets indicated by the input and output formats, each representation block includes one or more registers for storing the respective descriptor, and each descriptor is descriptive of a field of one of the packets and includes a field identifier and a length value indicative of a length of the field;
    a distribution block coupled to the representation blocks, wherein for each of the packets input by the circuit in the input format, the distribution block is configured to distribute the value of each descriptor for the packet to the representation block associated with the descriptor and is configured to distribute field values;
    at least one processing element coupled to the distribution block and respectively coupled to each of the at least one representation block, each processing element configured determine a condition in response to a field value, modify a field value in response to the condition being satisfied, and signal the at least one representation block with the condition;
    wherein the at least one representation block is configured to modify the value of the respective descriptor in response to the signal from the at least one processing element; and
    a gather block coupled to the representation blocks, wherein for each of the packets output by the circuit in the output format, the gather block is configured to gather the value of each descriptor for the packet from the representation block associated with the descriptor, gather field values for an output packet in response to descriptors output by the representation blocks, and in response to the at least one of the representation blocks modifying the value of the respective descriptor, change the input format to the output format.

2. The circuit of claim 1, wherein the representation block associated with each of the descriptors is one of a pass block for receiving the value of the descriptor from the distribution block and transmitting the value to the gather block, an insert block for generating the value of the descriptor and transmitting the value to the gather block, and a remove block for receiving the value of the descriptor from the distribution block or nullifying at least a portion of the value.

3. The circuit of claim 2, wherein for each packet input by the circuit in the input format, the insert block generates and transmits the value of the descriptor in response to the packet, and the remove block nullifies the at least the portion of the value of the descriptor in response to the packet.

4. The circuit of claim 1, wherein the at least one of the representation blocks includes an insert block having a condition input port and a description input port, the insert block transmitting the value of the respective descriptor from the description input port to the gather block in response to an assertion of a value from the condition input port.

5. The circuit of claim 4, wherein the at least one of the representation blocks includes the insert block and another representation block, the another representation block asserting the value for the condition input port of the insert block in response to the value of the respective descriptor of the another representation block.

6. The circuit of claim 1, wherein the at least one of the representation blocks includes a remove block having a condition input port, the remove block transmitting a nullification of at least a portion the value of the respective descriptor from the distribution block to the gather block in response to an assertion of a value from the condition input port.

7. The circuit of claim 1, wherein the at least one of the representation blocks includes a remove block having a condition input port, the remove block eliminating the respective descriptor and not passing the respective descriptor to the gather block in response to an assertion of a value from the condition input port.

8. The circuit of claim 1, wherein:
one of the representation blocks comprises an insert block adapted to modify the length of the field of the respective descriptor from a zero value to a non-zero value in response to the input format not having the field and the output format having the field; and
another one of the representation blocks comprises a remove block adapted to modify the length of the field of the respective descriptor from a non-zero value to a zero value in response to the input format having the field and the output format not having the field.

9. The circuit of claim 1, wherein the identifier of each of the fields is a sequence number in an overall order that encompasses both an incoming order of the fields in the input format and an outgoing order of the fields in the output format, the incoming order being the overall order after removing the fields appearing in the output format but not appearing in the input format, and the outgoing order being the overall order after removing the fields appearing in the input format but not appearing in the output format.

10. The circuit of claim 1, wherein the input and output formats of the packets include a plurality of fields of the packets input and output by the circuit, at least one of the packets input and output by the circuit having different ones of the fields than at least another one of the packets input and output by the circuit.

11. The circuit of claim 1, wherein:
for each of the packets, the distribution block distributes the values of the descriptors in an incoming order of the descriptors in the input format; and
for each of the packets, the gather block gathers the values of the descriptors in an outgoing order of the descriptors in the input format.

12. The circuit of claim 11, wherein the incoming and outgoing orders differ in response to the at least one representation block modifying the value of the respective descriptor.

13. The circuit of claim 11, wherein incoming and outgoing orders differ because one of the orders includes at least one of the descriptors that is not included in another one of the orders.

14. The circuit of claim 11, wherein the distribution block distributes the values of the descriptors received in the incoming order from a description input port of the circuit and the gather block gathers the values of the descriptors transmitted in the outgoing order to a description output port of the circuit.

15. A non-transitory program storage medium, comprising:
a processor-readable storage device configured with instructions for producing a circuit for managing input and output formats of a plurality of packets of a communication protocol, wherein execution of the instructions by at least one processor causes the at least one processor to perform operations including,
generating a plurality representation blocks, each associated with a respective one of a plurality of descriptors of the input and output formats of the packets of the communication protocol, each representation block processing a value of the respective descriptor for each of the packets, and at least one of the representation blocks adapted to modify the value of the respective descriptor;
wherein the plurality of representation blocks includes a representation block for each field of the packets indicated by the input and output formats, each representation block includes one or more registers for storing the respective descriptor, and each descriptor is descriptive of a field of one of the packets and includes a field identifier and a length value indicative of a length of the field;
generating a distribution block coupled to the representation blocks, wherein for each of the packets input in the input format, the distribution block distributes field values and distributes the value of each descriptor for the packet to the representation block associated with the descriptor;
generating at least one processing element coupled to the distribution block and respectively coupled to each of the at least one representation block, each processing element configured determine a condition in response to a field value, modify a field value in response to the condition being satisfied, and signal the at least one representation block with the condition;
wherein the at least one representation block is configured to modify the value of the respective descriptor in response to the signal from the at least one processing element; and
generating a gather block coupled to the representation blocks and to the at least one processing element, wherein for each of the packets output in the output format, the gather block gathers the value of each descriptor for the packet from the representation block associated with the descriptor, gathers field values for an output packet in response to descriptors output by the representation blocks, and in response to the at least one of the representation blocks modifying the value of the respective descriptor, changes the input format is changed to the output format.

16. The program storage medium of claim 15, wherein:
the generating of the at least one processing element includes generating a plurality of respective processing elements for each of a plurality of fields of the input and output formats of the packets input and output;
the respective processing element for each field comprises one of a pass block for passing the field, an insert block for inserting the field, or a remove block for removing the field;

the plurality of respective processing elements are ordered in an overall order that corresponds to both an incoming order of the fields in the input format and an outgoing order of the fields in the output format;

the overall order ends with a last one of the respective processing elements; and the generating of the representation blocks further includes generating the representation blocks that each are a combination of at least one processing element within a contiguous subsequence of the overall order, the contiguous subsequence including exactly one of the insert, remove, or last blocks, and the contiguous subsequence ending with the one of the insert, remove, or last blocks.

17. The program storage medium of claim 16, wherein:

the generating of the representation blocks further includes evaluating a performance metric of each of a plurality of arrangements of the representation blocks and selecting one of the arrangements of the representation blocks in response to the performance metric.

18. A system for producing a circuit for managing input and output formats of a plurality of packets of a communication protocol, comprising:

means for generating a plurality representation blocks, each associated with a respective one of a plurality of descriptors of the input and output formats of the packets of the communication protocol, each representation block processing a value of the respective descriptor for each of the packets, and at least one of the representation blocks adapted to modify the value of the respective descriptor;

wherein the plurality of representation blocks includes a representation block for each field of the packets indicated by the input and output formats, each representation block includes one or more registers for storing the respective descriptor, and each descriptor is descriptive of a field one of the packets and includes a field identifier and a length value indicative of a length of the field;

means for generating a distribution block coupled to the representation blocks, wherein for each of the packets input in the input format, the distribution block distributes field values and distributes the value of each descriptor for the packet to the representation block associated with the descriptor;

means for generating at least one processing element coupled to the distribution block and respectively coupled to each of the at least one representation block, each processing element configured determine a condition in response to a field value, modify a field value in response to the condition being satisfied, and signal the at least one representation block with the condition;

wherein the at least one representation block is configured to modify the value of the respective descriptor in response to the signal from the at least one processing element; and means for generating a gather block coupled to the representation blocks and to the at least one processing element, wherein for each of the packets output in the output format, the gather block gathers the value of each descriptor for the packet from the representation block associated with the descriptor, gathers field values for an output packet in response to descriptors output by the representation blocks, and in response to the at least one of the representation blocks modifying the value of the respective descriptor, changes the input format to the output format.

* * * * *